United States Patent [19]

Brehm et al.

[11] Patent Number: 4,978,377
[45] Date of Patent: Dec. 18, 1990

[54] METHOD OF ASSEMBLING A FIBER OPTIC PREFORM FROM DISCRETE PREFORMED ELEMENTS

[75] Inventors: Claude Brehm, Montrouge; Josiane Ramos, Bondoufle; Philippe Dupont, Melun, all of France

[73] Assignee: Alcatel N.V., Amsterdam, Netherlands

[21] Appl. No.: 447,554

[22] Filed: Dec. 7, 1989

[30] Foreign Application Priority Data

Dec. 9, 1988 [FR] France ............... 88 16224

[51] Int. Cl.⁵ ............................................. C03C 25/02
[52] U.S. Cl. .................... 65/3.11; 350/96.33; 65/61
[58] Field of Search .......... 65/3.11, 3.12, 61; 427/163; 350/96.33, 96.3

[56] References Cited

U.S. PATENT DOCUMENTS

| | | | |
|---|---|---|---|
| 4,105,283 | 8/1978 | Gloge et al. | 350/96.31 |
| 4,360,371 | 11/1982 | Blankenship et al. | 65/18.2 |
| 4,395,270 | 7/1983 | Blankenship et al. | 65/3.11 |
| 4,415,230 | 11/1983 | Keck | 350/96.3 |
| 4,478,489 | 10/1984 | Blankenship et al. | 350/96.3 |
| 4,549,891 | 10/1985 | Plummer | 65/3.12 |
| 4,561,871 | 12/1985 | Berkey | 65/3.12 |
| 4,681,399 | 7/1987 | Hicks | 350/96.3 |

FOREIGN PATENT DOCUMENTS

| | | | |
|---|---|---|---|
| 3417560 | 11/1984 | Fed. Rep. of Germany | 350/96.30 |
| 61-228404 | 10/1986 | Japan | 350/96.30 |
| 61-267707 | 11/1986 | Japan | 350/96.30 |
| 62-8105 | 1/1987 | Japan | 350/96.30 |
| 2012983 | 8/1979 | United Kingdom | |
| 2180232 | 5/1987 | United Kingdom | |

OTHER PUBLICATIONS

Stolen et al., Substrate-Tube Lithography for Optical Fibers, Electronics Letters, vol. 18, No. 18, pp. 764-765, 1982.

Birch et al., Fabrication of Polarisation-Maintaining Fibers Using Gas Phase Etching, Electronics Letters, vol. 18, No. 24, pp. 1036-1038, 1982.

Noda et al., Polarization Maintaining Fibers and their Applications, Journal of Lightwave Technology, vol. LT-4, No. 8, Aug. '86, pp. 1071-1089.

8 km-long Polarisation-Maintaining Fibre with Highly Stable Polarisation State; Sasaki, Hosaka, Takada and Noda; Electronics Letters, Sep. 15, 1983.

Primary Examiner—David L. Lacey
Assistant Examiner—John J. Bruckner
Attorney, Agent, or Firm—Christie, Parker & Hale

[57] ABSTRACT

A method of providing a preform for a polarization-maintaining optical fiber, starting from a basic preform (1) having two orthogonal planes of symmetry intersecting along its axis, and mechanically applying two discrete preformed oblong elements (15) of silica doped with boron oxide on the outside face of said basic preform symmetrically about the first plane (20), and two oblong elements of silica doped with titanium oxide on the outside face of said basic preform and symmetrically about the second plane (30). The shapes of the basic preform and the four oblong elements are selected to define a substantially solid cylinder.

10 Claims, 3 Drawing Sheets

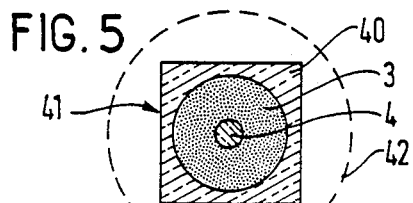
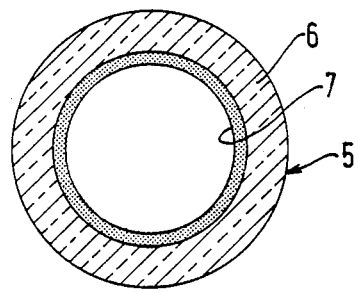
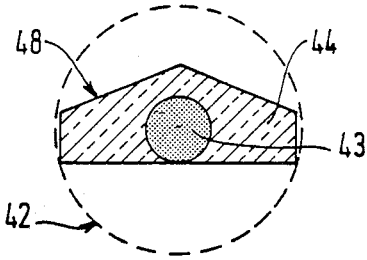
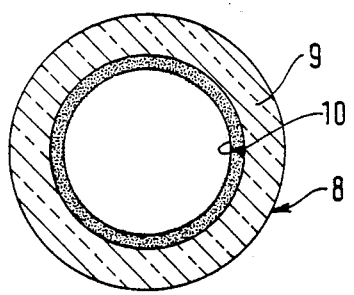
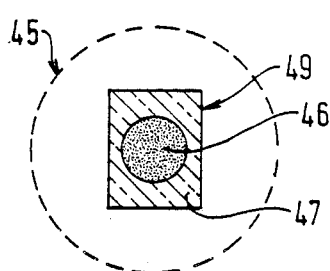
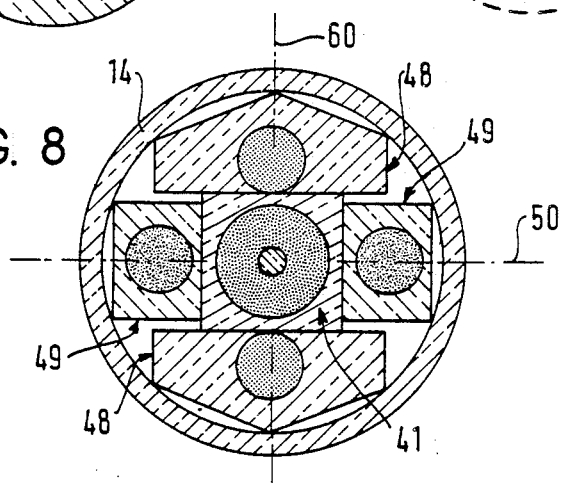

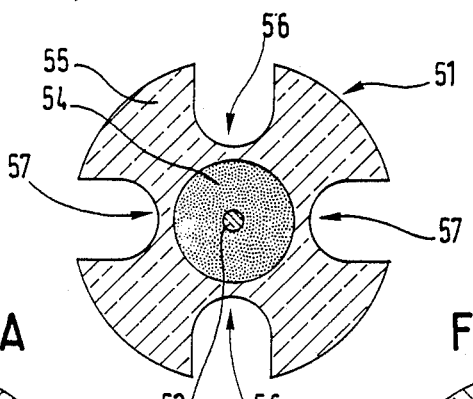
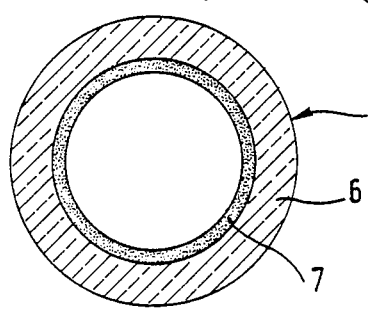
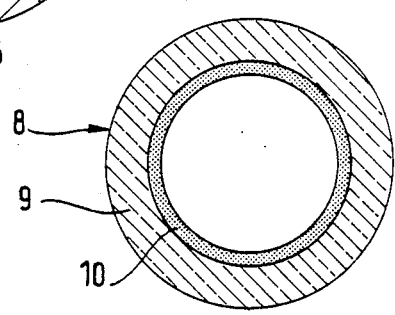
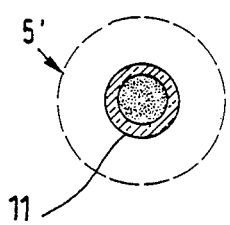
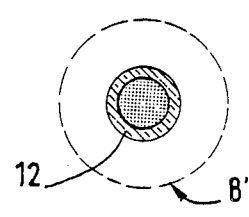
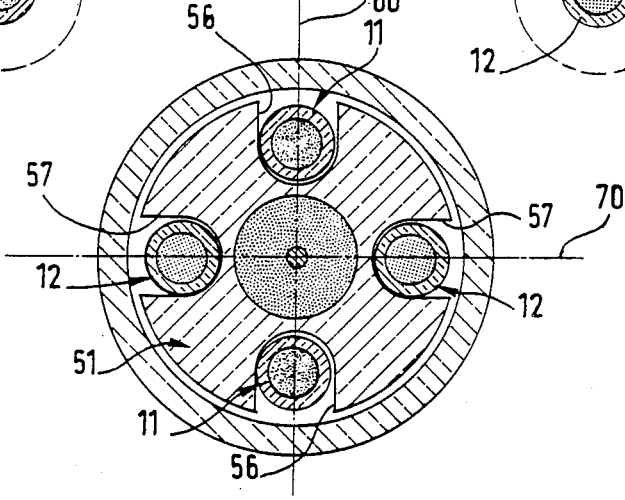

METHOD OF ASSEMBLING A FIBER OPTIC PREFORM FROM DISCRETE PREFORMED ELEMENTS

The present invention relates to a method of providing a preform for a polarization-maintaining optical fiber.

BACKGROUND OF THE INVENTION

Each time it is necessary to maintain a light polarization state stable over a period of time, in spite of external constraints (changes in temperature, pressure, ... ), the conventional low loss monomode optical fiber for optical telecommunications must be replaced by a special fiber which manages to maintain polarization. Because of residual imperfections (slight ellipticity, anisotropic stresses), conventional "circularly-symmetrical" monomode fibers are capable, in practice, of conveying two orthogonal polarized propagation modes, and because of mode coupling effects the polarization state at the outlet from the fiber is unstable.

Linear polarization maintaining fibers have linear birefringence introduced by removing the degeneracy of the two linear polarization states of the fundamental mode, either by shape birefringence (elliptical core), or by stress birefringence (anisotropic stress around the core), or else by a combination of both. Such fibers are advantageous for networks, long distance links, and coherent detection optical telecommunication systems, and also for some optical fiber sensor applications, e.g. hydrophones.

Various methods of making linear polarization maintaining fibers are known, and are described in reference [1] "Polarization maintaining fibers and their applications" by J. Noda et al. published in the Journal of Lightwave Technology, Vol. LT-4, No. 8, pp. 1071–1089, 1986. "Bow-tie" fibers are provided by MCVD deposition of the cladding and the core on a tube including diametrically opposite circular sectors which are doped with boron.

In reference [2] "Substrate tube lithography for optical fibers" by R. H. Stolen et al. published in Electronics Letters, Vol. 18, No. 18, pp. 764–765, 1982, these sectors are made by selective chemical etching. This technique is difficult: it consists in using a solution of hydrofluoric acid to etch sectors of boron oxide doped silica that have not been protected by deposition of a photosensitive resin. There are numerous steps: deposition, UV exposure, development, etching, etc.

In reference [3] "Fabrication of polarization-maintaining fibers" by R. D. Birch et al. in Electronics Letters, Vol. 18, No. 24, pp. 1036–1038, 1982, these sectors are made by selective thermal etching. Etching is performed in this case by hydrogen fluoride gas acting on portions that have been heated by means of a blow lamp.

In both preceding cases, subsequent deposition of the optical cladding and of the core is performed on an asymmetrical structure which leads, after collapsing, to a non-circular core, thereby increasing losses on coupling to a standard line fiber having a circular core. In the second case, it is possible to reduce this effect by an additional stage of localized redeposition, as described in British patent application GB-A-2 180 232. This makes the method even more complicated and even so the result is far from perfect.

In reference [4] "Polarization-maintaining fiber" by Y. Sasaki et al., published in Electronics Letters, Vol. 19, pp. 792–794, 1983, a "pin-in-jacket" or "panda" method is implemented requiring the envelope to be pierced, which is a difficult operation to implement over a long length without running the risk of breaking the preform.

In all of the methods methods above, zones of boron oxide doped silica are inserted on either side of the core. In order to obtain high birefringence, it is necessary to insert zones in the preform which give rise to high levels of stress, and very often this leads to the preforms cracking or even bursting.

Finally, European patent application EP-A-0 145 031 describes a method in which the following are disposed around a basic preform inside a tube of silica cladding glass, firstly two cylinders of silica doped at least with boron oxide, and secondly two cylinders of silica doped with titanium oxide. The empty spaces inside the tube are provided with rods of non-doped silica. It is extremely difficult to maintain all these items in their proper positions relative to one another. It is observed that fibers produced by this method have core deformations which is a handicap when coupling to genuinely circular fibers, or else they have external deformations which complicates subsequent handling of the fiber.

The object of the present invention is therefore to avoid the above-mentioned drawbacks and to provide in a simpler manner a high birefringence polarization-maintaining fiber which is easy to couple or connect to network fibers.

SUMMARY OF THE INVENTION

The present invention provides a method of providing a preform for a polarization-maintaining optical fiber, starting from a basic preform having two orthogonal planes of symmetry intersecting along its axis, and mechanically applying two oblong elements at least partially constituted by silica doped at least with boron oxide on the outside face of said basic preform symmetrically about the first plane, and two oblong elements at least partially constituted by silica doped at least with titanium oxide on the outside face of said basic preform and symmetrically about the second plane, wherein said basic preform and the four above-mentioned oblong elements are selected in such a manner as to complement one another so as to substantially define a cylinder.

In a first implementation said basic preform has a cylindrical outside face and each oblong element is a portion of a tube cut along two planes intersecting along the tube axis. Said tube may be a support tube provided on its inside with a deposit of silica doped with boron oxide or with titanium oxide, with the tube being cut longitudinally by means of a diamond saw.

In a second implementation said basic preform has a prismatic outside face (e.g. square) and each oblong element is obtained by collapsing a tube of pure silica doped with boron oxide or titanium oxide, with the pure silica portion subsequently being machined or polished laterally so as to form a prism of polygonal section (e.g. square).

In a third implementation said initially cylindrical basic preform is machined so as to form four grooves in its outside surface for receiving respective ones of said oblong elements which are constituted by cylindrical blanks.

A blank containing boron oxide or titanium oxide is obtained by collapsing a support tube containing internal deposits of silica doped with boron oxide or with titanium oxide, and then in eliminating the support tube either totally or in part.

In a variant applicable to any implementation, the above preform is inserted in a silica tube prior to collapsing the entire assembly.

The preform made in this way is then subjected in conventional manner to a fiber drawing operation.

If necessary, for reasons to do with the value of its refractive index, the boron oxide doped silica further includes germanium oxide doping, and the titanium oxide doped silica further includes fluorine doping.

Since boron oxide has a high expansion coefficient and titanium oxide has a low expansion coefficient, the boron oxide doped sectors give rise to a compression stress along a first direction perpendicular to the axis of the fiber, whereas the titanium oxide and fluorine doped sectors, give rise to an extension stress along a second direction perpendicular to the first direction, thereby inducing high linear birefringence. These stresses are induced around a core which is indeed circular.

The addition of fluorine to the titanium oxide at a similar molar concentration makes it possible to reduce or even cancel the increase in index due to the presence of the titanium, thereby avoiding parasitic light guiding effects.

BRIEF DESCRIPTION OF THE DRAWINGS

Implementations of the invention are described by way of example with reference to the accompanying drawings, in which:

FIG. 5 is a diagrammatic cross-section through a variant basic preform which is prismatic;

FIG. 6A is a cross-section through a tube analogous to that shown in FIG. 2A, i.e. constituted by a silica support having internal deposits of silica doped with boron oxide;

FIG. 6B is a cross-section view through an oblong element obtained from the tube of FIG. 6A;

FIGS. 7A and 7B are respectively analogous to FIGS. 6A and 6B, but show a silica support tube having internal deposits of silica doped with titanium oxide;

FIG. 8 shows another example of a preform in accordance with the invention built up from the elements of FIGS. 5, 6B, and 7B, and shown prior to being collapsed;

FIG. 9 is a diagrammatic cross-section through a variant basic preform which is cylindrical and has four longitudinal grooves;

FIG. 10A is a diagrammatic cross-section through a silica support tube having internal deposits of silica doped with boron oxide;

FIG. 10B shows a cylindrical blank obtained from the tube of FIG. 10A;

FIG. 11A is a diagrammatic cross-section through a silica support tube having internal deposits of silica doped with titanium oxide and fluorine;

FIG. 11B shows a cylindrical blank obtained from the tube of FIG. 11A; and

FIG. 12 is a cross-section through a preform of the invention as built up from the elements of FIGS. 9, 10B, and 11B, and shown prior to being collapsed.

DETAILED DESCRIPTION

Figure 1:
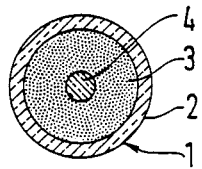
FIG. 1 is a diagrammatic cross-section through a conventional cylindrical basic preform.

FIG. 1 shows a preform 1 prepared by the conventional MCVD deposition technique. It is a monomode preform comprising a silica tube 2, containing silica cladding 3 doped with fluorine and phosphorous oxide, and a silica core 4 doped with germanium oxide. The thickness of the silica tube 2 may be reduced, e.g. by chemical etching or by blow torch evaporation.

Additionally, a tube 5 is prepared (FIG. 2A) constituted by a silica support tube 6 provided with silica deposits 7 obtained using the MCVD deposition technique, said deposits being doped with boron oxide and optionally co-doped with germanium oxide.

Similarly, a tube 8 is prepared (FIG. 3A) constituted by a silica support tube 9 provided with silica deposits 10 by the MCVD deposition technique, the deposits 10 being silica doped with titanium oxide and optionally co-doped with fluorine. Boron oxide has a high coefficient of expansion whereas titanium oxide has a low coefficient of expansion.

Figure 2B:
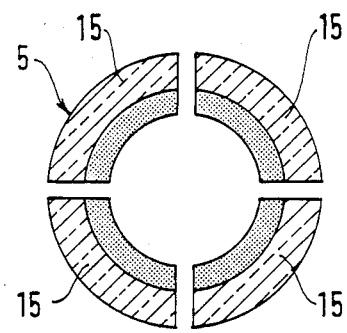
FIG. 2B is a cross-section through a cylindrical blank obtained from the tube of FIG. 2A, after being sliced into four portions.
Figure 3A:
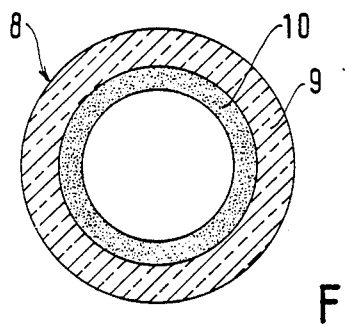
FIGS. 3A and 3B are views respectively analogous to FIGS. 2A and 2B but show a silica support tube having internal deposits of silica doped with titanium oxide.
Figure 3B:
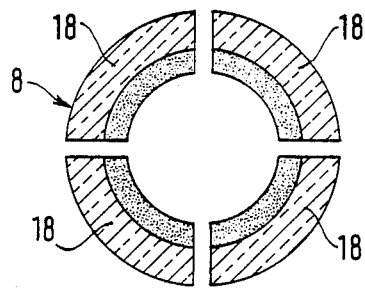

Each tube is cut up using a diamond saw along two planes intersecting along its axis so as to form four oblong elements 15 (FIG. 2B) and four oblong elements 18 (FIG. 3B).

Figure 4:
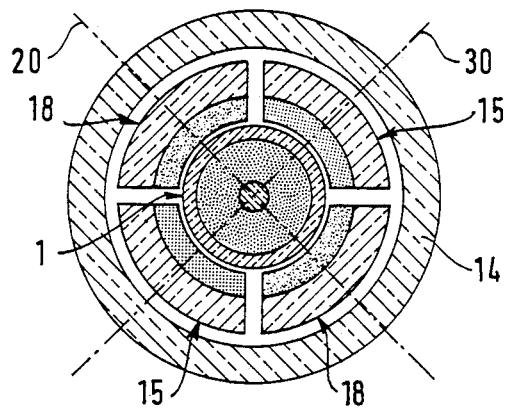
FIG. 4 shows an example of a preform in accordance with the invention built up from the elements of FIGS. 1, 2B, and 3B, and shown prior to being collapsed.

With reference to FIG. 4, the basic preform 1 can be seen together with two orthogonal planes referenced 20 and 30.

Two elements 15 are disposed against the preform 1 and symmetrically about the plane 20, and similarly two elements 18 are disposed against the preform 1 symmetrically about the plane 30. The cross-section of the four elements 15 and 18 defines a ring. All of these elements are easily fixed on the preform 1, e.g. by being welded at their ends. An outer tube of silica 14 is preferably disposed around this assembly which is then collapsed, preferably at reduced pressure, e.g. at 100 torrs, and at a temperature lying in the range 2000° C. to 2200° C.

This provides a preform which can be drawn into a fiber like a conventional preform. The sectors doped with boron oxide give rise to compression stress along a first direction perpendicular to the axis of the fiber. The sectors doped with titanium oxide give rise to extension stress along a second direction perpendicular to the first direction, thereby inducing high linear birefringence.

In a second variant, it is possible to follow the steps illustrated by FIGS. 5 to 8. The basic preform 41 is analogous to the preceding preform 1 except that its outer tube 42 is machined or polished so as to form a prism 40 which may be square in section, for example. By collapsing a tube 5 as shown in FIG. 6A and analogous to that shown in FIG. 2A, a cylinder 42 is obtained (FIG. 6B) which is then machined or polished so that the portion made of pure silica constitutes a prism 44 which is polygonal in section, and which contains a central cylinder 43 of silica doped with boron oxide. This oblong element is referenced 48.

By collapsing a tube 8 as shown in FIG. 7A and analogous to that shown in FIG. 3A, a cylinder 45 is obtained (FIG. 7B) and the portion thereof made of pure silica is machined or polished so as to obtain a prism 47 which is square in section and which contains a central cylinder 46 of silica doped with titanium oxide. This oblong element is referenced 49.

With reference to FIG. 8, the basic preform 41 is shown together with lines 50 and 60 defining two orthogonal planes of symmetry. Two oblong elements 48 are disposed on either side of the plane 50 and two oblong elements 49 are disposed on either side of the plane 60.

The shapes to which these various elements are machined are selected so as to practically completely eliminate the empty spaces that arise when they are included inside an outer silica tube 14. The cross-section of the four elements is partially annular. Thereafter, the preform is collapsed as before.

In a third variant, the steps illustrated by FIGS. 9 to 12 are followed.

In FIG. 9, an initially cylindrical preform 51 comprises, in a silica tube 55, cladding 54 of silica doped with fluorine and phosphorous oxide, and a core 53 of silica doped with germanium oxide. This preform is prepared by the conventional MCVD deposition technique.

Four regularly spaced apart longitudinal grooves 56 and 57 are formed in the side face of this preform. These grooves are easily machined over the entire length of the preform, e.g. using a diamond tipped cutter.

Figure 2A:
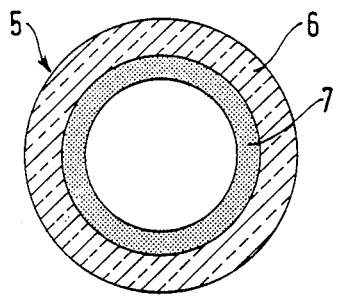
FIG. 2A is a diagrammatic cross-section through a silica support tube having internal deposits of silica doped with boron oxide.

In addition, a tube 5 (FIG. 10A) analogous to that shown in FIG. 2A is provided having deposits 7 of silica doped with boron oxide and optionally co-doped with germanium oxide.

Likewise, a tube 8 is provided (FIG. 11A) constituted by a support tube 9 provided, by the MCVD deposition technique, with deposits 10 of silica doped with titanium oxide and fluorine.

The tubes 5 and 8 are collapsed and become 5′ and 8′ (cf. FIGS. 10B and 11B), and at least some of the silica is eliminated from the support tubes by chemical etching or by blow torch evaporation. This provides blanks 11 and 12. Their diameters fit substantially in the dimensions of the grooves 56 and 57 provided in the preform 51, as can be seen in FIG. 12.

In this figure, lines 70 and 80 represent two orthogonal planes of symmetry presented by the preform 51. Two blanks 11 are disposed against the outside face of the preform in the grooves 56 symmetrically about the plane 70, and two blanks 12 are likewise deposed in the grooves 57 symmetrically about the plane 80. The blanks are easily retained in the corresponding grooves, and they preferably do not extend beyond the outside face of the perform 51.

The substantially cylindrical assembly formed in this way is inserted in an outer silica tube 14 and is then collapsed.

In all of the variants described above, a fiber is obtained in which high linear birefringence is induced. The fiber retains a highly circular core, thereby facilitating couplings and connections, and the fiber also retains good external circularity.

Naturally the invention is not limited to the embodiments as described. Thus, in the manufacture of the various tubes, it is possible to insert the oxides of boron, germanium, or titanium by spraying an aqueous or an organic solution of a chloride using the method described in French patent No. 87 14 286. As for the fluorine, it may be inserted in the form of a gas such as $SiF_4$, $C_2F_6$, $CF_2Cl_2$, $SF_6$, . . . , etc.

We claim:

1. A method of assembling a preform for a polarization-maintaining optical fiber, comprising the steps of
providing a basic monomode preform comprising a solid elongated silica core of circular cross section surrounded by a solid silica cladding, said basic preform having a longitudinal axis intersected by two orthogonal planes of symmetry,
attaching on the outside face of said basic preform a first pair of discrete preformed elongated stress elements each consisting essentially of silica doped with boron oxide, said first pair of elongated stress elements being disposed symmetrically about one of said planes and parallel to said axis,
attaching on the outside face of said basic preform a second pair of discrete preformed elongated stress elements each consisting essentially of silica doped with titanium oxide said second pair of elongated stress elements being disposed symmetrically about the other of said planes and parallel to said axis, wherein said basic preform, said first pair of elongated stress elements, and said second pair of elongated stress elements complement one another in cross section so as to form a substantially solid cylinder of circular cross section, consisting of the basic preform and two pairs of elongated stress elements, when the two pairs of elongated stress elements are attached to the basic preform.

2. A method according to claim 1, wherein said basic preform has a cylindrical outside face and each elongated element is a portion of a circular tube cut along two planes intersecting along the tube axis.

3. A method according to claim 2, wherein said tube is a support tube provide on its inside with a deposit of silica doped either with boron oxide or with titanium oxide, said tube subsequently being cut longitudinally by means of a diamond saw.

4. A method according to claim 1, wherein said basic preform has a prismatic outside face and said pairs of elongated elements are obtained by collapsing tubes of pure silica internally doped with either boron oxide or titanium oxide, with the pure silica portion subsequently being machined or polished laterally so as to form a prism of polygonal section.

5. A method according to claim 4, wherein the cross-section of said basic preform is square.

6. A method according to claim 1, wherein said basic preform is an initially circular cylindrical basic preform which has been machined so as to form two pairs of grooves in its outside surface for receiving respective pairs of said elongated stress elements which consist of cylindrical blanks.

7. A method according to claim 6, wherein the cylindrical blanks are formed from a boron oxide blank or a titanium oxide blank which is formed by collapsing a support tube containing internal deposits of silica doped either with boron oxide or with titanium oxide, and then totally or partially eliminating said support tube.

8. A method according to claim 1, wherein the assembly defined by said basic preform and said four elongated stress elements is inserted into an outer silica tube and the whole assembly is then collapsed.

9. A method according to claim 1, wherein the silica doped with boron oxide further includes germanium oxide.

10. A method according to claim 1, wherein the silica doped with titanium oxide further includes fluorine doping.

* * * * *